United States Patent [19]
Ozeki et al.

[11] Patent Number: 5,717,489
[45] Date of Patent: Feb. 10, 1998

[54] POLARIZATION MODE DISPERSION MEASURING INSTRUMENT AND METHOD

[75] Inventors: Takeshi Ozeki, 3-11-17-903, Sakaecho, Kawaguchi-shi, Saitama; Hiroshi Mori, Nerima, both of Japan

[73] Assignees: Advantest Corporation, Tokyo; Takeshi Ozeki, Saitama, both of Japan

[21] Appl. No.: 818,866

[22] Filed: Mar. 17, 1997

[30] Foreign Application Priority Data

Mar. 29, 1996 [JP] Japan ................... 8-076735

[51] Int. Cl.$^6$ ................... G01J 4/04
[52] U.S. Cl. ................... 356/364; 250/225
[58] Field of Search ................... 356/364, 365, 356/366, 367, 368, 369, 73.1; 250/225

[56] References Cited

U.S. PATENT DOCUMENTS

| | | | |
|---|---|---|---|
| 5,227,623 | 7/1993 | Heffner | 356/364 |
| 5,298,972 | 3/1994 | Heffner | 356/364 |
| 5,371,597 | 12/1994 | Favin et al. | 356/367 |

*Primary Examiner*—Hoa Q. Pham
*Attorney, Agent, or Firm*—Kanesaka & Takeuchi

[57] ABSTRACT

A polarization mode dispersion measuring apparatus includes a variable wavelength light source for providing light of a variety of wavelengths; a light intensity modulator optically connected to the light source to provide light of modulated intensity; a polarization controller optically connected to the light intensity modulator to provide light of controlled polarization; a beam splitter optically connected to the polarization controller to provide beams of p and s polarization components; an O/E conversion unit optically connected to the beam splitter to provide electrical signals with respect to the beams of the p and s polarization components; and an analyzing unit for controlling the light intensity modulator to provide a sine wave of a predetermined frequency and a predetermined intensity, and the light source and the polarization controller to determine parameters of Jones matrix from the electrical signals and a polarization mode dispersion defined by the parameters, thereby measuring a polarization mode dispersion of an object placed between the polarization controller and the beam splitter.

4 Claims, 2 Drawing Sheets

POLARIZATION MODE DISPERSION MEASURING INSTRUMENT AND METHOD

BACKGROUND OF THE INVENTION

1. Field of the Invention

The present invention relates to methods of and apparatus for measuring the polarization mode dispersion of optical fibers for use in optical communications.

2. Description of the Related Art

In optical communications, polarization planes are used to provide multiple values for increasing information amounts or contents of optical signals. Consequently, it is necessary to use optical fibers having identical polarization modes and, therefore, to measure the polarization mode dispersion for each guide wave frequency.

The polarization mode dispersion defined by Stokes parameters has been used for such measurement. The Stokes parameters include four parameters for expressing the polarization conditions including the polarization degree. If orthogonal x and y components of elliptically polarized light are $$Ex = Ax \cos(\omega t - \Delta x)$$

$$Ey = Ay \cos(\omega t - \Delta y)$$

$$\Delta y - \Delta x = \Delta$$

then respective parameters $S_0$, $S_1$, $S_2$, and $S_3$ are expressed as $$S_0 = Ax^2 + Ay^2$$

$$S_1 = Ax^2 - Ay^2$$

$$S_2 = 2AxAy \cos \Delta$$

$$S_3 = 2AxAy \sin \Delta$$

For perfectly polarized light, $S_0^2 = S_1^2 + S_2^2 + S_3^2$. Since $S_0$ is a parameter for expressing the light intensity, the polarization mode dispersion is given by the following expressions:

$$\tau_{PMD,S} = 2\sqrt{\bar{\alpha}_1^2 + \bar{\beta}_1^2} \quad (1)$$

$$\bar{\alpha}_1 = \frac{\dot{S}}{2\sqrt{1 - S_1^2}} \quad (2)$$

$$\bar{\beta}_1 = \frac{\dot{S}_2 \cdot S_3 - \dot{S}_3 \cdot S_2}{2(1 - S_1^2)} \quad (3)$$

FIG. 2 shows a conventional polarization measuring instrument for measuring the polarization mode dispersion by the Stokes parameters.

The measuring instrument consists of a variable wavelength light source 201, an optical coupler 202, a fiber-type polarizer 203, an optical fiber 204 to be measured, a Stokes analyzer 205, an A/D converter 206, a wavelength meter 207, and a control unit 208.

The variable wavelength light source 201 adjusts the wavelength of output light in response to a control signal from the control unit 208. The optical coupler 202 divides the light from the light source 201 into two; one being directed to the fiber-type polarizer 203 and the other to the wavelength meter 207. The light linearly polarized in the polarizer 203 enters the Stokes analyzer 205 via the optical fiber 204. The Stokes analyzer 205 incorporates optical measurement elements, such as light detectors and receivers, to determine the Stokes parameters $S_0$–$S_3$. The Stokes parameters $S_0$–$S_3$ are then digitized in the A/D converter 206 and fed to the control unit 208. A signal indicative of the wavelength of the measurement light is also fed to the control unit 208 from the wavelength meter 207 to determine the polarization mode dispersion for the wavelength of the light from the variable wavelength light source 201 through the above expressions (1)–(3) and the inputted Stokes parameters $S_1$–$S_3$. Then, the control unit 208 changes the wavelength of the light from the light source 201 for repeating the above operations.

In the above conventional polarization mode dispersion measuring method, the Stokes parameters $S_1$–$S_3$ are used to define the polarization mode dispersion by the expressions (1)–(3). If the Stokes parameter $S_1$ approaches $\pm 1$, $\bar{\beta}_1$ diverges so that it is impossible to determine the polarization mode disperion for the object to be measured whose Stokes parameter $S_1$ is near $\pm 1$.

SUMMARY OF THE INVENTION

Accordingly, it is an object of the invention to provide a polarization mode dispersion measuring apparatus and a method capable of measuring a wide variety of objects.

According to the invention there is provided a polarization mode dispersion measuring apparatus which includes a variable wavelength light source for providing light of a variety of wavelengths; a light intensity modulator optically connected to the light source to provide light of modulated intensity; a polarization controller optically connected to the light intensity modulator to provide light of controlled polarization; a beam splitter optically connected to the polarization controller to provide beams of p and s polarization components; an O/E conversion unit optically connected to beam splitter to provide electrical signals with respect to beams of the p and s polarization components; and an analyzing unit for controlling the light intensity modulator to provide a sine wave of a predetermined frequency and a predetermined intensity, and the light source and the polarization controller to determine parameters of Jones matrix from the electrical signals and a polarization mode dispersion defined by the parameters, thereby measuring a polarization mode dispersion of an object placed between the polarization controller and the beam splitter.

The analyzing unit includes a network analyzer for controlling the light intensity modulator to modulate intensity of light from the light source and determining parameters of Jones matrix from the electrical signals from the O/E conversion unit and a control unit for controlling the light source and the polarization controller to determine the polarization mode diepserion defined by parameters.

The control unit scans the variety of wavelengths of light from the light source for measurement and permits for each of the scanned wavelengths a linearly polarized wave of the light from the polarization controller aligned with a p direction of the beam splitter to enter the object and then rotates the light from the polarization controller by 90° and permits a linearly polarized wave aligned with an s direction of the beam splitter to enter the object.

The analyzing unit corrects measurements of the object placed between the polarization controller and the polarized beam splitter based on initial measurements made in advance with no object placed between the polarization controller and the polarized beam splitter.

According to another aspect of the invention there is provided a method of measuring a polarization mode dispersion by directing a linearly polarized light sine wave of a predetermined light intensity and frequency to a polarized beam splitter via an object to measure a polarization mode dispersion of the object from p and s polarization components from the polarized beam splitter, which includes the step of scanning wavelengths to determine parameters of Jones matrix and a polarization mode dispersion defined by the parameters.

The method further includes a step of determining initial measurements without any object to correct measurements with an object based on the initial measurements.

According to the invention Jones matrix for expressing characteristics of polarization elements is used to define polarization mode dispersion so as to avoid the fact that the use of Stokes parameters for defining polarization mode dispersion makes it impossible to measure polarization mode dispersion.

The frequency dependency of phase change and amplitude of matrix elements of a transfer function matrix [T] of an optical fiber is defined by Jones matrix as follows:

$$[T(\omega)] = \begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \quad (4)$$

wherein $|T_{ij}|$ and $\phi_{ij}$ are the amplitude and the phase change of each matrix element, respectively, and functions of light frequency $\omega$.

The polarization mode dispersion $\tau_{PMD}$ is defined as follows:

$$\tau_{PMD} = 2\sqrt{\theta^2 + \psi_1^2 \cos^2\theta + \psi_2^2 \sin^2\theta} \quad (5)$$

wherein $\theta$ is the polarization angle, $\phi_1$ the phase change in a direction in a plane perpendicular to the direction of light propagation, and $\phi_2$ the phase change in a direction perpendicular to $\phi_1$.

Each parameter of the expression (5) is determined through the expression (4) as follows:

$$\theta(\omega) = a \cos(|T_{11}|^2 - |T_{21}|^2) \quad (6)$$

$$\phi_1(\omega) = (\phi_{11} - \phi_{22})/2, \phi_2(\omega) = (\phi_{21} - \phi_{12} + \pi)/2 \quad (7)$$

Accordingly, by measuring each component of the expression (4), it is possible to determined the polarization mode dispersion $\tau_{PMD}$ through the expression (5).

According to the invention, out-of-phase and in-phase components of two orthogonal components of phase change in the expression (7) are defined as follows:

$$\phi(\omega) = (\phi_1(\omega) - \phi_2(\phi))/2 \quad (8)$$

$$\phi(\omega) = (\phi_1(\omega) - \phi_2(\omega))/2 \quad (9)$$

Taylor expansions about $\theta(\omega)$, $\phi(\omega)$, and $\phi(\omega)$ are given as follows:

$$\theta(\omega) = \theta_0 + \overline{\alpha_1}(\omega - \omega_0) + \tfrac{1}{2}\overline{\alpha_2}(\omega - \omega_0)^2 \quad (10)$$

$$\phi(\omega) = \phi_0 + \overline{\beta_1}(\omega - \omega_0) + \tfrac{1}{2}\overline{\beta_2}(\omega - \omega_0)^2 \quad (11)$$

$$\psi(\omega) = \psi_0 + \overline{\gamma_1}(\omega - \omega_0) + \tfrac{1}{2}\overline{\gamma_2}(\omega - \omega_0)^2 \quad (12)$$

The polarization mode dispersion $\tau_{PMD}$ given by the expression (5) is modified through the expressions (10), (11) and (12) as follows:

$$\tau_{PMD} = 2\sqrt{\overline{\alpha_1}^2 + \overline{\beta_1}^2 + \overline{\gamma_1}^2 + 2\overline{\beta_1}\overline{\gamma_1}\cos 2\theta_0} \quad (13)$$

Thus, the polarization mode dispersion $\tau_{PMD}$ defined in the invention has three parameters $\{\theta, \phi, \phi\}$.

The polarization mode dispersion defined by Stokes parameter according to the prior art is expressed as follows:

$$\tau_{PMD,S} = 2\sqrt{\overline{\alpha_1}^2 + \overline{\beta_1}^2}$$

and has only two parameters $\{\theta, \phi\}$. Since there is no in-phase component $\phi$, it diverges when Stokes parameter $S_1$ is near $\pm 1$. By contrast three parameters $\{\theta, \phi, \phi\}$ are measured to determine polarization mode dispersion in the invention so that it is possible to avoid the inability to measure polarization mode dispersion $\tau_{PMD}$ as in the prior art and to broaden the range of objects to be measures.

DESCRIPTION OF THE PREFERRED EMBODIMENT

Figure 1:
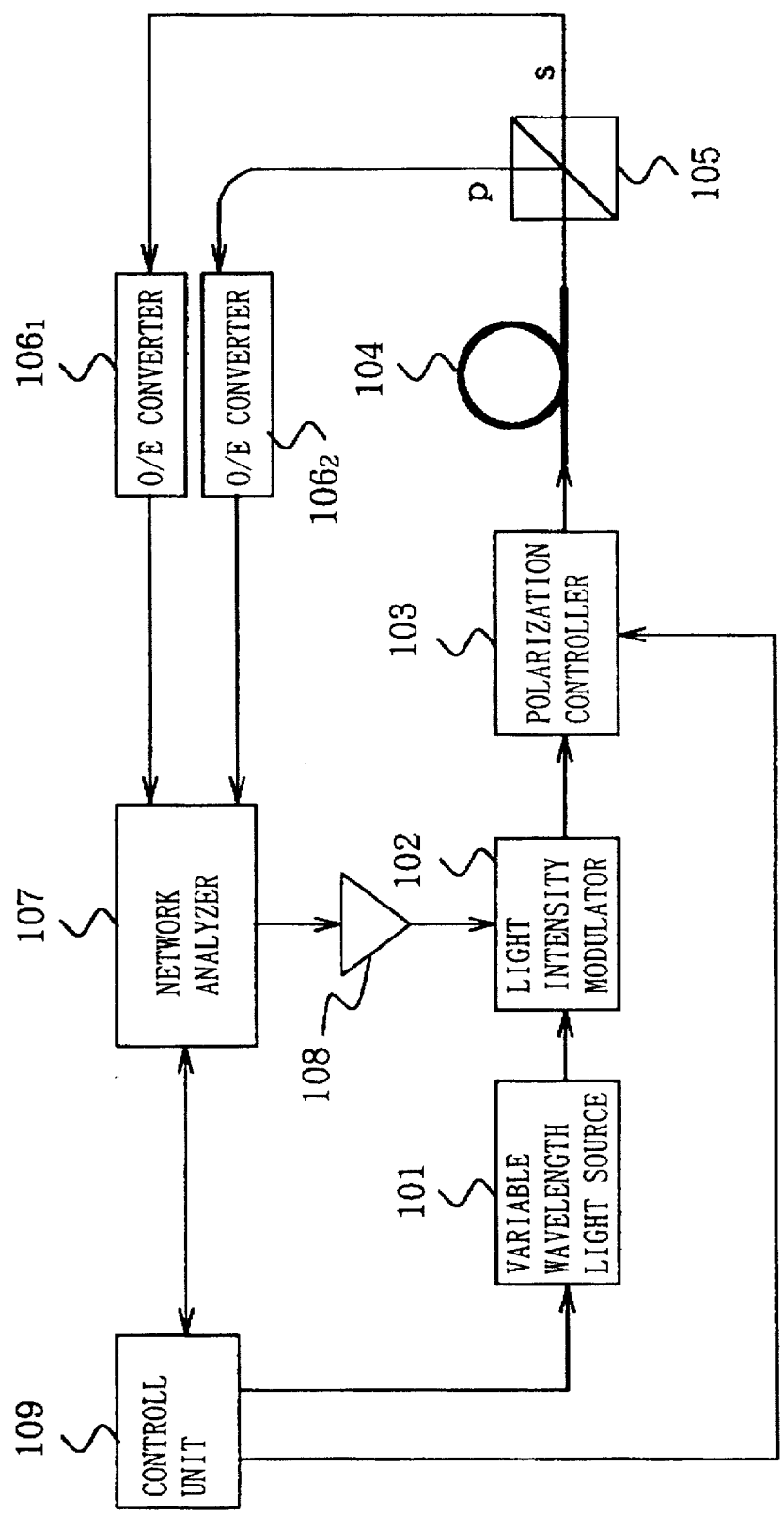
FIG. 1 is a block diagram of a polarization mode dispersion measuring apparatus according to an embodiment of the invention.
Figure 2:
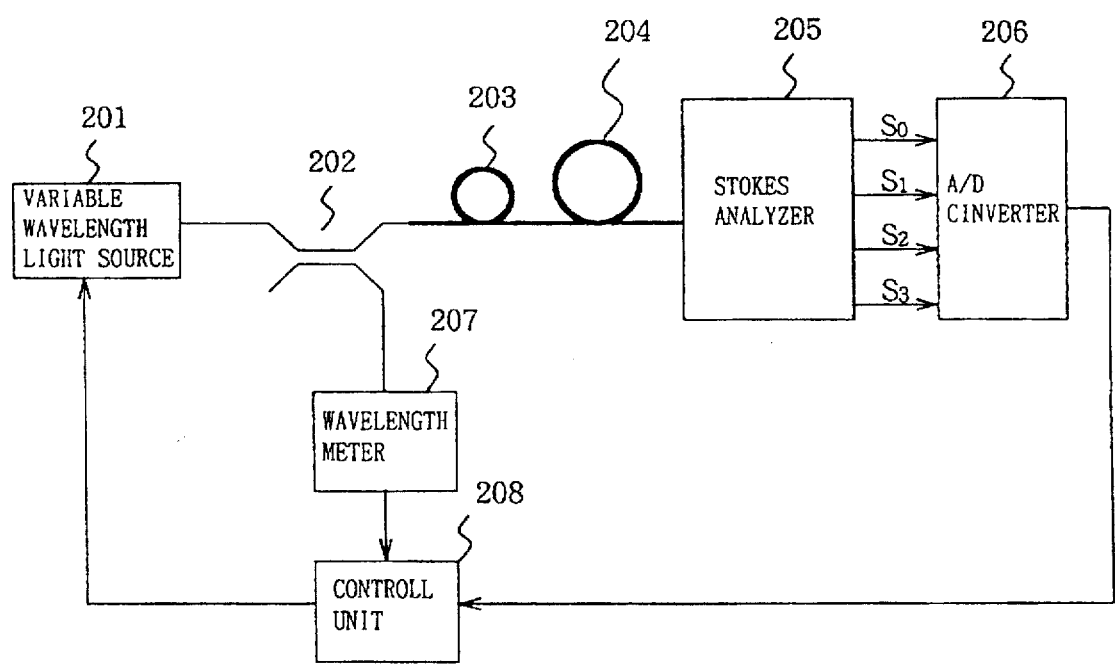
FIG. 2 is a block diagram of a conventional polarization mode dispersion measuring apparatus.

In FIG. 1, the polarization condition or mode measuring apparatus includes a variable wavelength light source 101, a light intensity modulator 102, a polarization controller 103, an optical fiber 104 to be measured, a polarized beam splitter 105, an O/E converter $106_1$ and $106_2$, a network analyzer 107, an amplifier 108, and a control unit 109 for cooperating with the network analyzer 107 to form an analyzing unit.

The light intensity modulator 102 modulates the intensity of light from the light source 101 so that the light has a sine wave having an intensity of approx. a few GHz and a fixed frequency of fm and feeds it to the polarization controller 103. The polarization controller 103 controls the polarization of the input light, and the output light enters the polarized beam splitter 105 via the optical fiber 104. The s and p polarization components from the beam splitter 105 are converted into electrical signals in the O/E converter $106_1$ and $106_2$, respectively, and fed to the network analyzer 107. The network analyzer 107 determines the polarization mode dispersion $\tau_{PMD}$ from the input values and controls the intensity modulation ratio in the intensity modulator 102 via the amplifier 108. The control unit 109 responds to the operation conditions of the network analyzer 107 to control the output wavelength of the light source 101 and the polarization conditions in the polarization control 103.

In order to determine the accurate polarization mode dispersion $\tau_{PMD}$, the network analyzer 107 stores values of the s and p polarization components for respective wavelengths of the light from the light source 101 which does not go through the optical fiber 104. Based on these stored values, it corrects the output values of the O/E converters $106_1$ and $106_2$ to increase the accuracy of measurements of the polarization mode dispersion $\tau_{PMD}$.

In operation, upon measurement, the control unit 109 makes the output light of the polarization controller 103 of the linear polarization aligned with the p direction of the polarized beam splitter 105 and permits it to enter the optical fiber 104. The output light of the optical fiber 104 is given by the following expression.

$$\begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \begin{bmatrix} 1 \\ 0 \end{bmatrix} \begin{bmatrix} |T_{11}|e^{-j\phi_{11}} & (p\text{ component}) \\ |T_{21}|e^{-j\phi_{21}} & (s\text{ component}) \end{bmatrix} \quad (4)$$

The output light is divided by the beam splitter 105 into the s and p polarization components and fed to the O/E converters $106_1$ and $106_2$ to determine $$|T_{11}|e^{-j\phi_{11}}, |T_{21}|e^{-j\phi_{21}}$$

Then, the control unit 109 rotates the output light of the polarization controller 103 by 90° to provide a linearly polarized wave aligned with the s direction of the beam splitter 105 and permits it to enter the optical fiber 104. The output light of the optical fiber 104 is given by the following expression.

$$\begin{bmatrix} |T_{11}|e^{-j\phi_{11}} & |T_{12}|e^{-j\phi_{12}} \\ |T_{21}|e^{-j\phi_{21}} & |T_{22}|e^{-j\phi_{22}} \end{bmatrix} \begin{bmatrix} 0 \\ 1 \end{bmatrix} \begin{bmatrix} |T_{12}|e^{-j\phi_{12}} & (p\text{ component}) \\ |T_{22}|e^{-j\phi_{22}} & (s\text{ component}) \end{bmatrix} \quad (5)$$

The above output beams are separated into the s and p polarization components, respectively, by the beam splitter 105 and fed to the O/E converters $106_1$ and $106_2$ to determine $$|T_{12}|e^{-j\phi_{12}}, |T_{22}|e^{-j\phi_{22}}$$

The network analyzer 107 determines $\theta$, $\phi_1$, $\phi_2$ through the measured parameters and the expressions (6) and (7).

The measurement is repeated by scanning the output wavelength of the light source 101 to determine $\theta(\omega)$, $\phi_1(\omega)$, and $\phi_2(\omega)$ from the respective measurements, and the control unit 109 determines the polarization mode dispersion $\tau_{PMD}$ through the expression (5).

Alternatively, the O/E converters provided for the p and s polarization components may be replaced by a single O/E converter to which the respective polarization components are directed.

According to the invention it is possible to measure all parameter values and broaden the range of objects to be measured and increase the accuracy of measurements.

What is claimed is:

1. Polarization mode dispersion measuring apparatus comprising:
    a variable wavelength light source for providing light of a variety of wavelengths;
    a light intensity modulator optically connected to said light source to provide light of modulated intensity;
    a polarization controller optically connected to said light intensity modulator to provide light of controlled polarization;
    a beam splitter optically connected to said polarization controller to provide beams of p and s polarization components;
    O/E conversion means optically connected to said beam splitter to provide electrical signals with respect to said beams of said p and s polarization components; and
    analyzing means for controlling not only said light intensity modulator to provide a sine wave of a predetermined frequency and a predetermined intensity but also said light source and said polarization controller to determine parameters of Jones matrix from said electrical signals and a polarization mode dispersion defined by said parameters, thereby measuring a polarization mode dispersion of an object placed between said polarization controller and said beam splitter.

2. A polarization mode dispersion measuring apparatus according to claim 1, wherein said analyzing means comprises:
    a network analyzer for controlling said light intensity modulator to modulate said intensity of light from said light source and determining parameters of Jones matrix from said electrical signals from said O/E conversion means and
    a control unit for controlling said light source and said polarization controller to determine said polarization mode dispersion defined by said parameters.

3. A polarization mode dispersion measuring apparatus according to claim 2, wherein said control unit scans said variety of wavelengths of light from said light source for measurement and permits for each of said scanned wavelengths a linearly polarized wave of said light from polarization controller aligned with a p direction of said beam splitter to enter said object and then rotates said light from said polarization controller by 90° and permits a linearly polarized wave aligned with an s direction of said beam splitter to enter said object.

4. A polarization mode dispersion measuring apparatus according to claim 1, 2, or 3, wherein said analyzing means corrects measurements of said object placed between said polarization controller and said polarized beam splitter based on initial measurements made in advance with no object placed between said polarization controller and polarized beam splitter.

* * * * *